US012531183B2

(12) United States Patent
Takayama

(10) Patent No.: US 12,531,183 B2
(45) Date of Patent: Jan. 20, 2026

(54) COIL COMPONENT

(71) Applicant: Murata Manufacturing Co., Ltd., Kyoto-fu (JP)

(72) Inventor: Kota Takayama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 740 days.

(21) Appl. No.: 18/047,985

(22) Filed: Oct. 19, 2022

(65) Prior Publication Data

US 2023/0135284 A1 May 4, 2023

(30) Foreign Application Priority Data

Oct. 28, 2021 (JP) ................................ 2021-176448

(51) Int. Cl.
*H01F 27/28* (2006.01)
*H01F 27/24* (2006.01)
*H01F 27/29* (2006.01)

(52) U.S. Cl.
CPC ............. *H01F 27/29* (2013.01); *H01F 27/24* (2013.01)

(58) Field of Classification Search
USPC ........................................ 336/192, 221, 198
See application file for complete search history.

(56) References Cited

U.S. PATENT DOCUMENTS 6,242,996 B1 * 6/2001 Sato ...................... H01F 17/045 336/200
2003/0071704 A1 * 4/2003 Toi .......................... H01F 27/36 336/83
2004/0263285 A1 * 12/2004 Suzuki .................. H01F 41/082 333/185
2008/0224813 A1 * 9/2008 Hirai ..................... H01F 17/045 336/216
2018/0019046 A1 * 1/2018 Miyamoto ................ H01F 3/14
2019/0244744 A1 * 8/2019 Takenaka .............. H01F 17/045
2019/0287710 A1 * 9/2019 Igarashi ................ H01F 27/323
2020/0105451 A1 * 4/2020 Horie .................... H01F 27/263

FOREIGN PATENT DOCUMENTS

JP 2008-198740 A 8/2008
JP 2009-147158 A 7/2009
JP 2009-231547 A 10/2009
JP 2011-096815 A 5/2011
JP 2020-136422 A 8/2020
WO 2007/060961 A1 5/2007

* cited by examiner

*Primary Examiner* — Shawki S Ismail
*Assistant Examiner* — Kazi S Hossain
(74) *Attorney, Agent, or Firm* — Studebaker Brackett PLLC

(57) ABSTRACT

A coil component includes a core, and projection is on a lower main surface of a top plate and a recess for receiving the projection is in a top surface of a flange portion in the core. The projection has a frustoconical shape, for example, and the cavity formed by the recess has a conical inner peripheral surface. An outer surface of the projection and a wall surface that defines the recess form guide surfaces which guide the projection into the recess and form first and second abutment portions, respectively, that are brought into abutment against each other. The abutment between the first and second abutment portions defines the termination end of the projection inserted into the recess with a gap between the lower main surface of the top plate and the top surface of the flange portion and aligns the top plate relative to the core.

20 Claims, 15 Drawing Sheets

COIL COMPONENT

CROSS-REFERENCE TO RELATED APPLICATION

This application claims benefit of priority to Japanese Patent Application No. 2021-176448 filed Oct. 28, 2021, the entire content of which is incorporated herein by reference.

BACKGROUND

Technical Field

The present disclosure relates to a coil component including: a core including a winding core portion around which a wire is wound and a first flange portion and a second flange portion that are provided at the respective end portions of the winding core portion; and a top plate fixed to the core to be spanned between the first flange portion and the second flange portion, in particular, to the structure of a coupling portion between a core and a top plate.

Background Art

For example, Japanese Unexamined Patent Application Publication No. 2011-96815 describes a coil component including: a core including a winding core portion around which a wire is wound and a first flange portion and a second flange portion that are provided at the respective end portions of the winding core portion; and a top plate adhesive fixed to the core to be spanned between the first flange portion and the second flange portion.

The first flange portion and the second flange portion each have a bottom surface that faces a mounting substrate when the coil component is mounted, a top surface on the opposite side of the bottom surface, and an outer-side end surface that couples the bottom surface and the top surface to each other and is located on the opposite side of the winding core portion. The top plate described above is fixed to the core with an adhesive interposed therebetween while the lower main surface of the top plate is facing the top surface of each of the first flange portion and the second flange portion.

The first flange portion and the second flange portion are each provided with at least one terminal electrode. The terminal electrode is provided to integrally extend along each of the first flange portion and the second flange portion from the bottom surface to the top surface through the outer-side end surface.

Each end portion of the wire wound around the winding core portion is connected to the terminal electrode, and the connection portion between the end portion of the wire and the terminal electrode is located on the top surface of each of the first flange portion and the second flange portion. Thus, the top plate described above is placed at a predetermined distance from the top surface of each of the first flange portion and the second flange portion so that a magnetic gap can be formed between the flange portions and the top plate. This magnetic gap prevents the occurrence of magnetic saturation, thereby contributing to the improvement of the DC superimposition characteristics.

SUMMARY

In recent years, coil components high in current and inductance value have been increasingly demanded, and it is thus required to improve DC superimposition characteristics while acquiring a high inductance value.

Japanese Unexamined Patent Application Publication No. 2011-96815 describes the structure in which the gap is formed between the top plate and the core to improve the DC superimposition characteristics.

However, as described in Japanese Unexamined Patent Application Publication No. 2011-96815, in a coil component including a top plate and a core, desired inductance value and DC superimposition characteristics are obtained with the top plate and the core facing each other in a predetermined positional relationship. In other words, in order to obtain desired characteristics, the positional relationship between the top plate and the core is important. To achieve this, it is required that in the manufacturing stage of the coil component, the top plate and the core are assembled in a stable positional relationship. However, Japanese Unexamined Patent Application Publication No. 2011-96815 describes the gap but does not describe position control between the top plate and the core at points other than the gap.

In view of this, the present disclosure provides the structure of a coil component in which a stable positional relationship can be achieved while a gap is formed between a top plate and a core.

The present disclosure is directed to a coil component including: a core that includes a winding core portion that extends in an axial direction and a first flange portion and a second flange portion that are provided at a first end and a second end, respectively, that are opposite ends in the axial direction of the winding core portion; a top plate that has a lower main surface and an upper main surface that face directions opposite to each other; at least one wire wound around the winding core portion; and a first terminal electrode and a second terminal electrode that are electrically connected to respective end portions of the wire and provided at the first flange portion and the second flange portion, respectively.

The first flange portion and the second flange portion each have a bottom surface that faces a mounting substrate when the coil component is mounted and a top surface on an opposite side of the bottom surface. The top plate is fixed to the core with an adhesive interposed therebetween while the lower main surface is facing the top surface of each of the first flange portion and the second flange portion.

The present disclosure has the feature of having the following configuration in view of the technical problem described above.

When one of the top surface of at least one of the first flange portion and the second flange portion and the lower main surface is defined as a first surface and another thereof is defined as a second surface, a projection is provided on the first surface and a recess for receiving the projection is provided in the second surface.

At least one of an outer surface of the projection and a wall surface that defines the recess is provided with a guide surface capable of guiding the projection into the recess.

The outer surface of the projection and the wall surface that defines the recess form a first abutment portion and a second abutment portion, respectively, that are brought into abutment against each other when the recess receives the projection. An abutment between the first abutment portion and the second abutment portion defines a termination end of the projection inserted into the recess with a gap formed between the first surface and the second surface, thereby achieving positioning in a direction of the insertion and achieves alignment of the top plate relative to the core in at least one of directions along the first surface and the second surface.

According to the present disclosure, with the presence of the guide surfaces described above, the projection is smoothly guided into the recess and the first abutment portion and the second abutment portion described above are thus brought into abutment against each other, with the result that positioning in the predetermined direction between the top plate and the core is achieved while the gap is formed between the top plate and the core. Thus, in the manufacturing stage of the coil component, a stable positional relationship can be achieved while the gap is formed between the top plate and the core.

BRIEF DESCRIPTION OF THE DRAWINGS

FIGS. 1A and 1B illustrate the appearance of a coil component according to a first embodiment of the present disclosure, in which FIG. 1A is a front view and FIG. 1B is a left-side view;

FIGS. 2A and 2B separately illustrate a top plate and a core that are included in the coil component illustrated in FIGS. 1A and 1B, in which FIG. 2A is a bottom view of the top plate and FIG. 2B is a top view of the core;

DETAILED DESCRIPTION

Figure 1A:
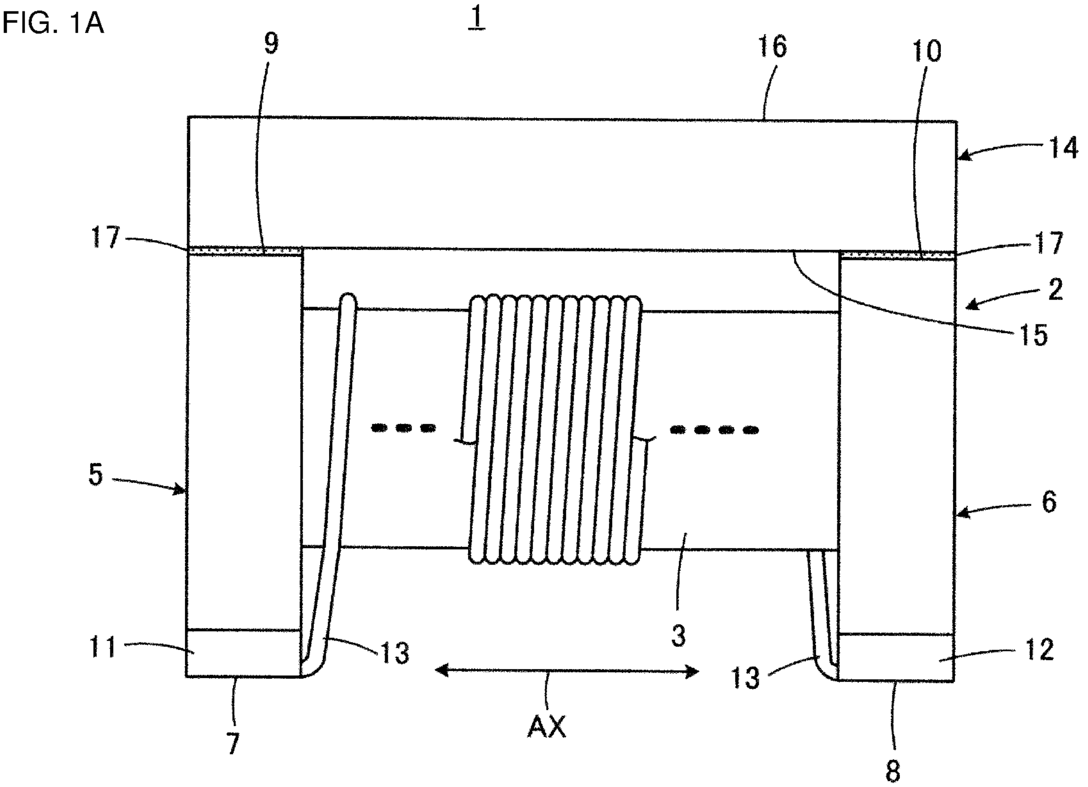
Figure 1B:
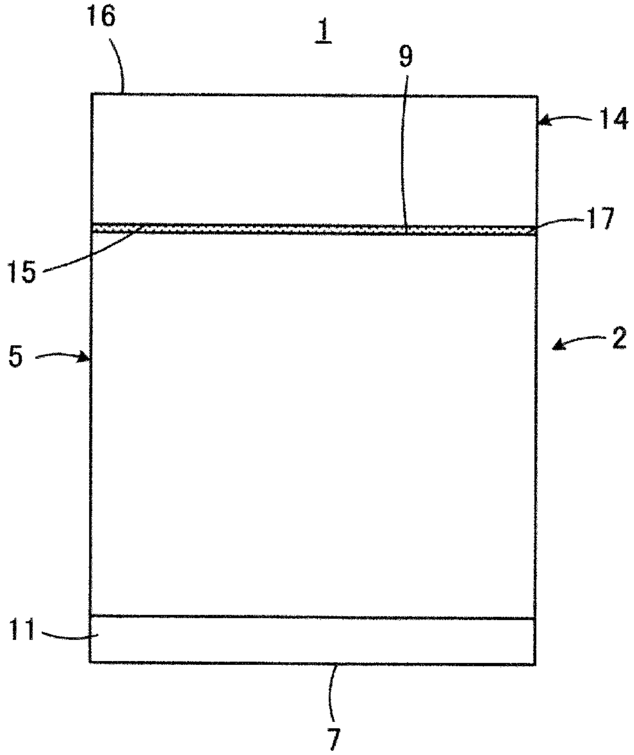

With reference to FIGS. 1A and 1B, the overview of a coil component 1 according to a first embodiment of the present disclosure is described.

As illustrated in FIGS. 1A and 1B, the coil component 1 includes a core 2 made of, for example, a resin containing ferrite such as Ni—Zn-based ferrite, alumina, or magnetic metal powder. The core 2 includes a winding core portion 3 that extends in an axial direction AX and a first flange portion 5 and a second flange portion 6 that are provided at a first end and a second end, respectively, that are opposite ends in the axial direction AX of the winding core portion 3. The cross-sectional shape of the winding core portion 3 is, for example, a rectangular shape but may be another shape such as a polygonal shape such as a hexagonal shape, a circular shape, an elliptical shape, or a shape obtained by combining them.

The first flange portion 5 and the second flange portion 6 have bottom surfaces 7 and 8 that face a mounting substrate (not illustrated) when the coil component 1 is mounted and top surfaces 9 and 10 on the opposite side of the respective bottom surfaces 7 and 8, respectively.

A first terminal electrode 11 is provided on the bottom surface 7 of the first flange portion, and a second terminal electrode 12 is provided on the bottom surface 8 of the second flange portion 6. The terminal electrodes 11 and 12 are formed by performing immersion or printing with a conductive paste containing conductive metal powder such as Ag powder, baking the resultant, and then sequentially performing Cu plating, Ni plating, and Sn plating, for example. Alternatively, the terminal electrodes 11 and 12 may be provided by mounting terminal members including conductive metal plates on the first and second flange portions 5 and 6.

At least one wire 13 is wound around the winding core portion 3. The wire 13 includes, for example, a central wire made of a metal with good conductivity such as copper, silver, or gold, and an insulating coating film covering the central wire and made of an electrical insulating resin such as polyamide imide, polyurethane, or polyester imide. The central wire has a diameter of 60 μm or more and 160 μm or less (i.e., from 60 μm to 160 μm), for example. One end of the wire 13 is connected to the first terminal electrode 11 on the side of the bottom surface 7 of the first flange portion 5 and the other end thereof is connected to the second terminal electrode 12 on the side of the bottom surface 8 of the second flange portion 6. The terminal electrodes 11 and 12 and the wire 13 are connected to each other by thermocompression bonding, ultrasonic welding, or laser welding, for example. The number of turns of the wire 13 on the winding core portion 3 is optionally selected depending on required characteristics. The wire 13 may include turns in multiple layers as needed.

The coil component 1 includes a top plate 14 spanned between the first flange portion 5 and the second flange portion 6 described above. The top plate 14 has a lower main surface 15 and an upper main surface 16 that face directions opposite to each other. The top plate 14 is made of, for example, a resin containing ferrite, alumina, magnetic metal powder, or the like. Note that when the core 2 and the top plate 14 are both made of magnetic materials, the top plate 14 forms a closed magnetic circuit together with the core 2.

The top plate 14 is fixed to the core 2 while the lower main surface 15 is facing the top surface 9 of the first flange portion 5 and the top surface 10 of the second flange portion 6 with an adhesive 17 interposed therebetween. The adhesive 17 contains a thermosetting resin such as an epoxy-based resin, for example. An inorganic filler such as a silica filler may be added to the adhesive 17 to improve the thermal shock resistance.

The coil component 1 has, for example, a dimension in the length direction (axial direction AX) of 2.0 mm, a dimension in a width direction (a direction vertical to the axial direction AX and in parallel with the mounting surface) of 1.2 mm, and a dimension in a height direction (a direction vertical to the axial direction AX and the width direction) of 1.6 mm. It is also conceivable that the coil component 1 is reduced in size to have a dimension in the length direction of 1.6 mm, a dimension in the width direction of 0.8 mm, and a dimension in the height direction of 1.3 mm. The smaller the coil component 1, the larger the effect according to the present disclosure due to the precision of assembly equipment. Note that the planar dimensions of the top plate 14 are generally equivalent to the planar dimensions of the core 2, and FIGS. 1A and 1B and FIGS. 2A and 2B illustrate the top plate 14 and the core 2 having the equivalent planar dimensions. The planar dimensions of the top plate 14 may, however, be larger than the planar dimensions of the core 2. With the top plate 14 having planar dimensions larger than the planar dimensions of the core 2, magnetic flux can positively pass through the top plate 14 even when the positions of the top plate 14 and the core 2 are slightly shifted from each other.

The coil component 1 is preferably manufactured as follows, for example.

First, the core 2 and the top plate 14 are each prepared. To manufacture each of the core 2 and the top plate 14, for example, ferrite powder is subjected to press forming with a mold and the obtained compact is fired to obtain a sintered compact that is to serve as the core 2 or the top plate 14. After that, the sintered compact that is to serve as the core 2 or the top plate 14 is subjected to barrel polishing to remove the burrs. Each of the core 2 and the top plate 14 is obtained in this way. Although not illustrated in FIGS. 1A and 1B, the core 2 and the top plate 14 each have a rounded ridge line round-chamfered a little.

Then, to provide the terminal electrodes 11 and 12 to the core 2, for example, a conductive paste containing Ag is applied to the bottom surfaces 7 and 8 of the first flange portion 5 and the second flange portion 6 to be baked, and then Cu plating, Ni plating, and Sn plating are sequentially performed by electrolytic barrel plating.

Next, the wire 13 is wound around the winding core portion 3 of the core 2 through nozzles, for example, and one end and the other end of the wire 13 are connected to the first terminal electrode 11 and the second terminal electrode 12, respectively. Here, the wire 13 and the terminal electrodes 11 and 12 are connected to each other by thermocompression bonding by a heater chip, for example. An excess portion of the wire 13 connected to the terminal electrodes 11 and 12 is cut and removed by a cutting blade.

Next, the top plate 14 is placed on the core 2 with the adhesive 17 interposed therebetween and the top plate 14 and the core 2 are thus fixed to each other.

The coil component 1 is completed as described above.

The coil component 1 has the following features. A description is made with reference to FIGS. 2A and 2B, and FIG. 3.

Figure 2A:
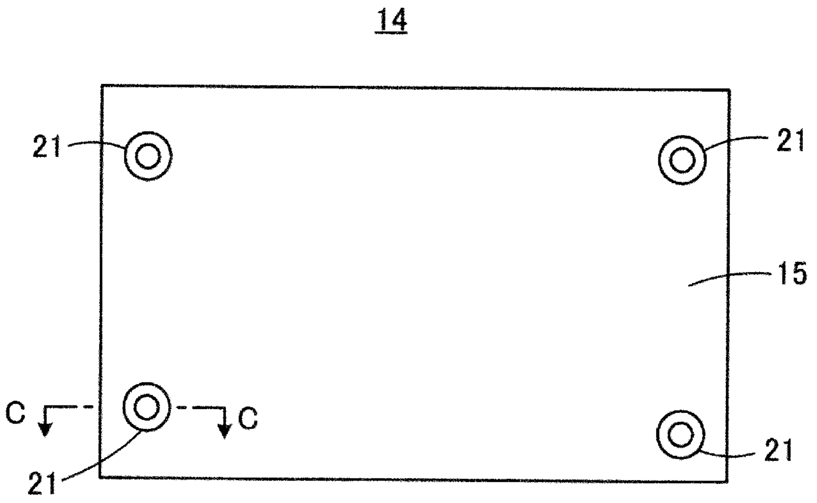
Figure 2B:
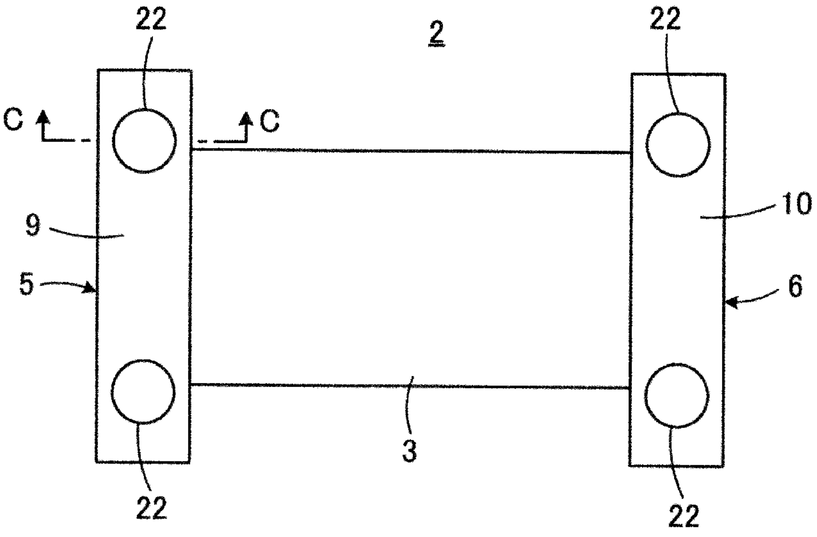

Projections 21 are provided on the lower main surface 15 of the top plate 14. On the other hand, recesses 22 for receiving the projections 21 described above are provided in the first top surface 9 of the first flange portion 5 and the second top surface 10 of the second flange portion 6 of the core 2. FIG. 2A illustrates the top plate 14 and FIG. 2B illustrates the core 2, and when the top plate 14 and the core 2 are combined, the top plate 14 and the core 2 are placed so that the surface of the top plate 14 appearing in FIG. 2A and the surface of the core 2 appearing in FIG. 2B face each other. In combining the top plate 14 and the core 2, the top plate 14 illustrated in FIG. 2A is placed on the core 2 illustrated in FIG. 2B with the posture rotated by 180 degrees about the axis of rotation extending in the left-right direction in FIGS. 2A and 2B.

In the present embodiment, the projections 21 are provided at a plurality of places on the lower main surface 15 of the top plate 14 in the form of spots and the recesses 22 are provided at a plurality of places on the first top surface 9 of the first flange portion 5 and the second top surface 10 of the second flange portion 6 in the form of spots. More specifically, the two recesses 22 are provided side by side in the width direction in each of the first top surface 9 of the first flange portion 5 and the second top surface 10 of the second flange portion 6 of the core 2, and the two projections 21 are provided side by side in the width direction on each of the region facing the first top surface 9 of the first flange portion 5 and the region facing the second top surface 10 of the second flange portion 6 on the lower main surface 15 of the top plate 14.

The projection 21 has an outer peripheral surface that forms at least a portion of a cone and the recess 22 has a conical inner peripheral surface. The projection 21 preferably has a frustoconical shape with the chamfered distal end. With this, the distal end of the projection 21 can be prevented from being chipped in manufacturing the coil component 1. The frustoconical projection 21 has a height H of 25 μm or more and 65 μm or less (i.e., from 25 μm to 65 μm), for example.

The outer surface of the projection 21 and a wall surface that defines the recess 22 function as guide surfaces capable of guiding the projection 21 into the recess 22. For example, in the cross section illustrated in FIG. 3, the projection 21 has a distal end portion smaller than the opening of the recess 22 in dimensions measured along the lower main surface 15 of the top plate 14. On the other hand, the recess 22 has a facing-inward sloped surface 23 inclined to reduce the dimensions of the recess 22 measured along the top surfaces 9 and 10 of the flange portions 5 and 6 from the opening toward the bottom. The facing-inward sloped surface 23 forms the guide surface described above. Further, for example, in the cross section illustrated in FIG. 3, the projection 21 has a facing-outward sloped surface 24 inclined to increase the dimensions of the projection 21 measured along the lower main surface 15 of the top plate 14 from the distal end portion of the projection 21 toward the base thereof that is a portion in contact with the lower main surface 15. The facing-outward sloped surface 24 forms the guide surface described above.

The outer surface of the projection 21 and the wall surface that defines the recess 22 form a first abutment portion 25 and a second abutment portion 26, respectively, that are brought into abutment against each other when the recess 22 receives the projection 21. More specifically, a ridge line portion at which the chamfered distal end surface at the distal end portion and the outer peripheral surface of the projection 21 intersect each other forms the first abutment portion 25 and a portion of the facing-inward sloped surface 23 of the recess 22 forms the second abutment portion 26.

Figure 3:
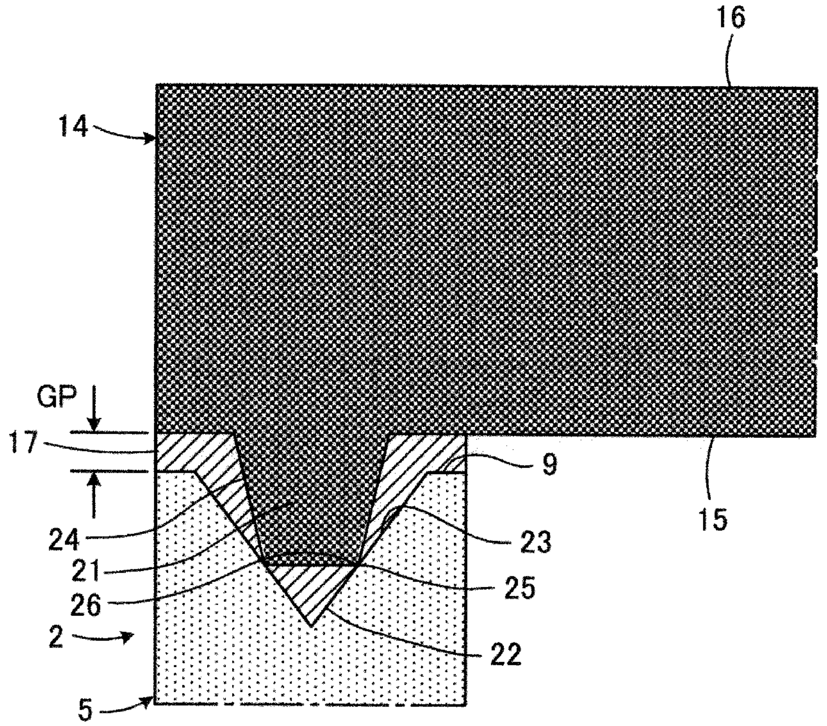
FIG. 3 is an enlarged sectional view taken along the line C-C of FIGS. 2A and 2B, schematically illustrating the top plate and the core, which are illustrated in FIGS. 2A and 2B, fixed to each other with an adhesive interposed therebetween.

In the cross section illustrated in FIG. 3, with respect to the extending direction of the lower main surface 15 of the top plate 14, the facing-outward sloped surface 24 corresponding to the outer peripheral surface of the projection 21 has a larger angle than the facing-inward sloped surface 23 corresponding to the inner peripheral surface of the recess 22. With this configuration, the inner peripheral surface of the recess 22 (facing-inward sloped surface 23) can be formed over a relatively large range, and hence the positioning effect is positively exhibited even with a relatively large positional shift between the projection 21 and the recess 22.

The abutment between the first abutment portion 25 and the second abutment portion 26 defines the termination end of the projection 21 inserted into the recess 22 with a gap GP formed between the lower main surface 15 of the top plate 14 and the top surfaces 9 and 10 of the respective first and second flange portions 5 and 6 included in the core 2, thereby achieving positioning in the direction of the insertion described above and achieves the alignment of the top plate 14 relative to the core 2 in at least one of directions along the lower main surface 15 and the top surfaces 9 and 10.

More specifically, even when the facing positions of the projection 21 and the recess 22 are shifted from each other, since at least one of the outer surface of the projection 21 and the wall surface that defines the recess 22 is provided with the guide surface capable of guiding the projection 21 into the recess 22, the facing positions of the projection 21 and the recess 22 can be matched with each other by the guide surface guiding the projection 21.

A direction in which positioning or alignment is achieved is at least one of the directions along the lower main surface 15 and the top surfaces 9 and 10 as described above. Positioning in the length direction (axial direction AX) or the width direction (left-right direction in FIG. 1B) of the coil component 1 is preferably achieved, and positioning in the length direction is more preferably achieved. This is because, since the length direction corresponds to the direction of magnetic flux in the coil component 1, the inductance value relatively largely varies when the core 2 and the top plate 14 have a positional shift in the length direction. Note that in the case of the projection 21 and the recess 22 illustrated in FIG. 3, the positioning of the top plate 14 relative to the core 2 in all directions along the lower main surface 15 and the top surfaces 9 and 10 is achieved.

The adhesive 17 is applied to at least a portion of, preferably, the entire region of the gap GP described above, and the top plate 14 and the core 2 are thus fixed to each other with the adhesive 17 interposed therebetween.

Note that, in the structure illustrated in FIG. 3, since the distal end of the projection 21 and the inner peripheral surface of the recess 22 form the first abutment portion 25 and the second abutment portion 26, the distal end portion of the projection 21 is not in contact with the bottom surface of the recess 22. That is, only the ridge line portion at the periphery of the distal end portion of the projection 21 is in contact with the inner peripheral surface of the recess 22 so that the adhesive 17, which is a resin, can be poured between the projection 21 and the recess 22 and the connection strength between the core 2 and the top plate 14 can therefore be improved.

In summary, the following configuration is realized with the projection 21 and the recess 22 having the forms as described above.

At least one of the outer surface of the projection 21 and the wall surface that defines the recess 22 is provided with the guide surface capable of guiding the projection 21 into the recess 22. The outer surface of the projection 21 and the wall surface that defines the recess 22 form the first abutment portion 25 and the second abutment portion 26, respectively, that are brought into abutment against each other when the recess 22 receives the projection 21. The abutment between the first abutment portion 25 and the second abutment portion 26 defines the termination end of the projection 21 inserted into the recess 22 with the gap GP formed between the lower main surface 15 of the top plate 14 and the top surfaces 9 and 10 of the flange portions 5 and 6, thereby achieving positioning in the direction of the insertion and achieves alignment in at least one of the directions along the lower main surface 15 of the top plate 14 and the top surfaces 9 and 10 of the flange portions 5 and 6.

Figure 4:
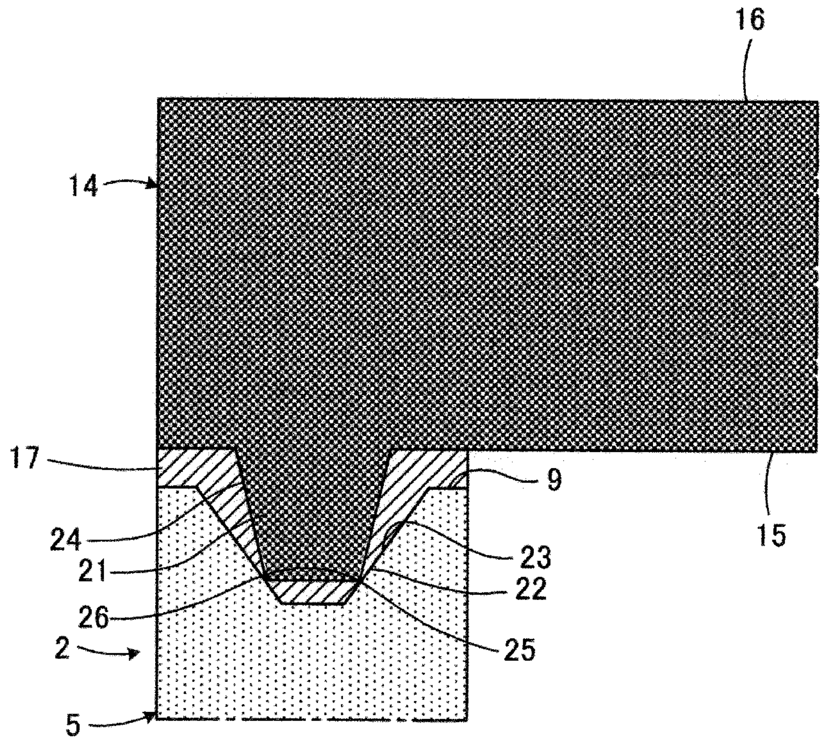
FIG. 4 is a view corresponding to FIG. 3, illustrating a second embodiment of the present disclosure and schematically illustrating the top plate and the core fixed to each other with the adhesive interposed therebetween.

Next, with reference to FIG. 4 and the following drawings, other embodiments of the present disclosure are described. In FIG. 4 and the following drawings, elements corresponding to the elements illustrated in FIGS. 2A and 2B or FIG. 3 are denoted by similar reference characters to omit a redundant description. The other embodiments are described in terms only of portions substantially different from the embodiment illustrated in FIGS. 2A and 2B and FIG. 3, or of features.

With reference to FIG. 4, in a second embodiment, although the recess 22 has a conical inner peripheral surface, the cavity formed by the recess 22 has a frustoconical shape. With this, a mold for molding the recess 22 can be prevented from being chipped.

Figure 5:
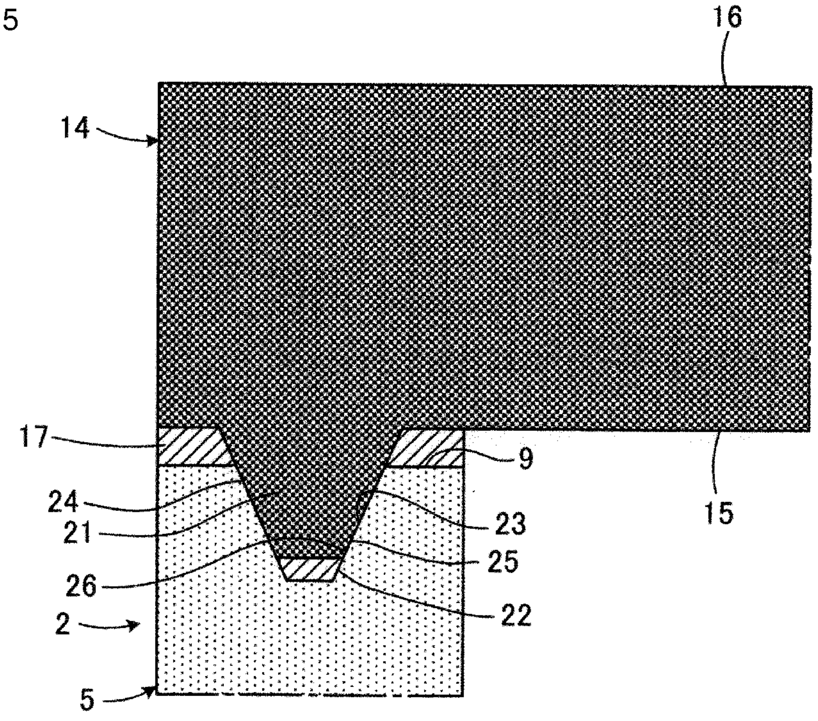
FIG. 5 is a view corresponding to FIG. 3, illustrating a third embodiment of the present disclosure and schematically illustrating the top plate and the core fixed to each other with the adhesive interposed therebetween.

In a third embodiment illustrated in FIG. 5, the cavity formed by the recess 22 has a frustoconical shape as in the structure illustrated in FIG. 4. On the other hand, although the projection 21 has a frustoconical shape, the inclination of the outer peripheral surface of the projection 21 is equal to the inclination of the inner peripheral surface of the recess 22. With this configuration, the stability of the coupling state between the top plate 14 and the core 2 can be increased.

Figure 6:
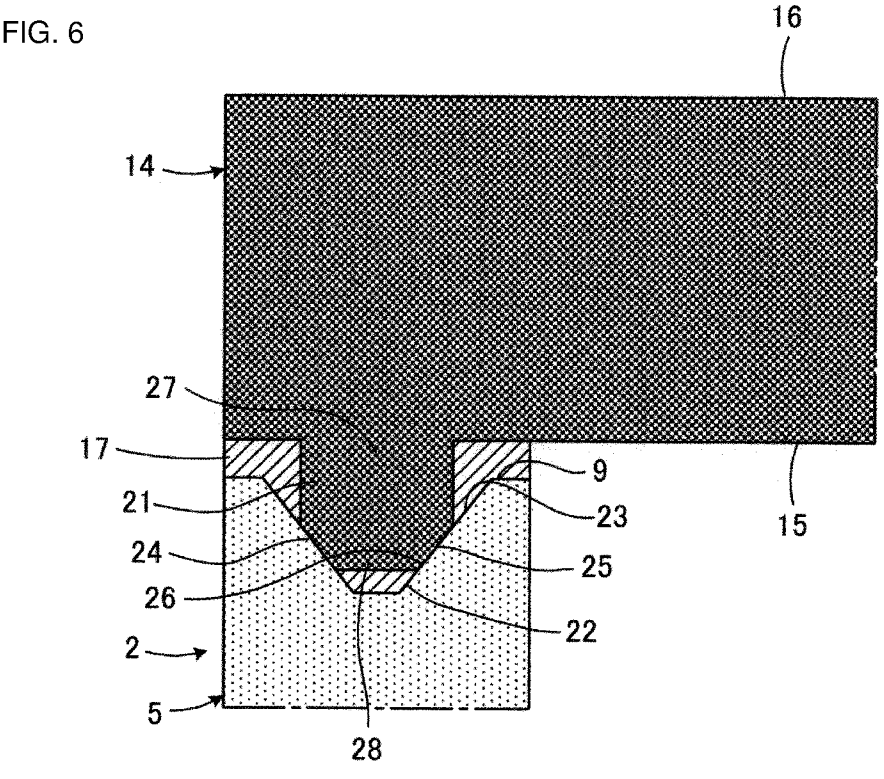
FIG. 6 is a view corresponding to FIG. 3, illustrating a fourth embodiment of the present disclosure and schematically illustrating the top plate and the core fixed to each other with the adhesive interposed therebetween.

In a fourth embodiment illustrated in FIG. 6, the cavity formed by the recess 22 has a frustoconical shape. On the other hand, the projection 21 has a cylindrical portion 27 and a frustoconical portion 28, and the cylindrical portion 27 is located on the base side and the frustoconical portion 28 is located on the distal end portion side. The inclination of the outer peripheral surface of the frustoconical portion 28 of the projection 21 is equal to the inclination of the inner peripheral surface of the recess 22.

Figure 7:
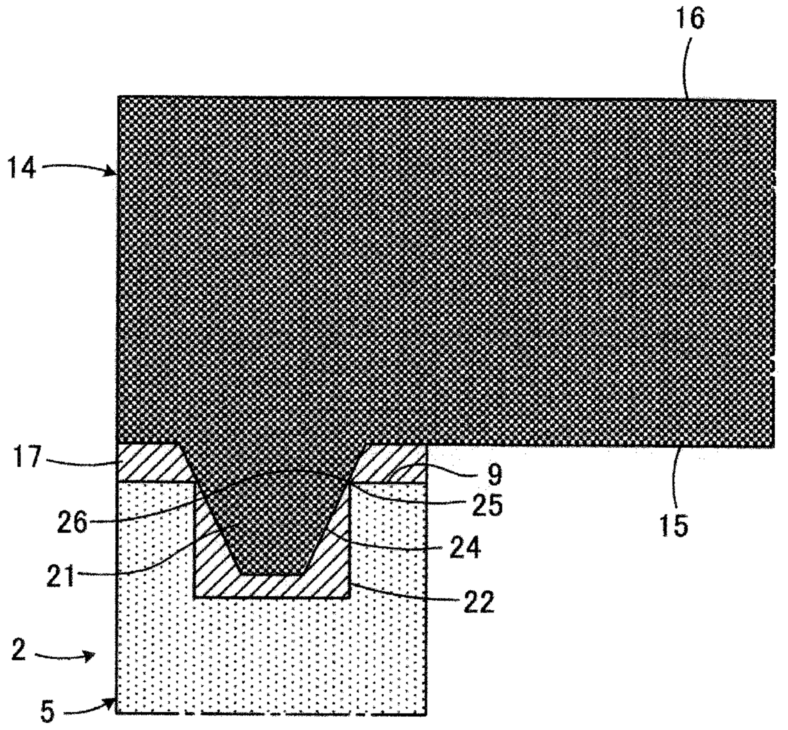
FIG. 7 is a view corresponding to FIG. 3, illustrating a fifth embodiment of the present disclosure and schematically illustrating the top plate and the core fixed to each other with the adhesive interposed therebetween.

In a fifth embodiment illustrated in FIG. 7, the projection 21 has a frustoconical shape. On the other hand, the cavity formed by the recess 22 has a cylindrical shape. In one of cross sections along the direction in which positioning is achieved, for example, in the cross section of FIG. 7, the projection 21 has the facing-outward sloped surface 24 inclined to increase the dimensions of the projection 21 measured along the lower main surface 15 of the top plate 14 from the distal end portion toward the base. The facing-outward sloped surface 24 forms the guide surface capable of guiding the projection 21 into the recess 22. Further, of the first abutment portion 25 and the second abutment portion 26 that are brought into abutment against each other when the recess 22 receives the projection 21, the first abutment portion 25 is formed by the facing-outward sloped surface 24 of the projection 21 and the second abutment portion 26 is formed by an edge portion that defines the opening of the recess 22.

With the structure illustrated in FIG. 7, a wide space can be secured between the projection 21 and the core 2 to allow the application of a sufficient amount of the adhesive 17, and the coupling between the core 2 and the top plate 14 can therefore be strengthened.

Note that, in a modification of the fifth embodiment illustrated in FIG. 7, the projection 21 may have a conical shape and the recess 22 may be formed as a deeper recess to prevent the distal end of the projection 21 from being in contact with the bottom of the recess 22.

Figure 8:
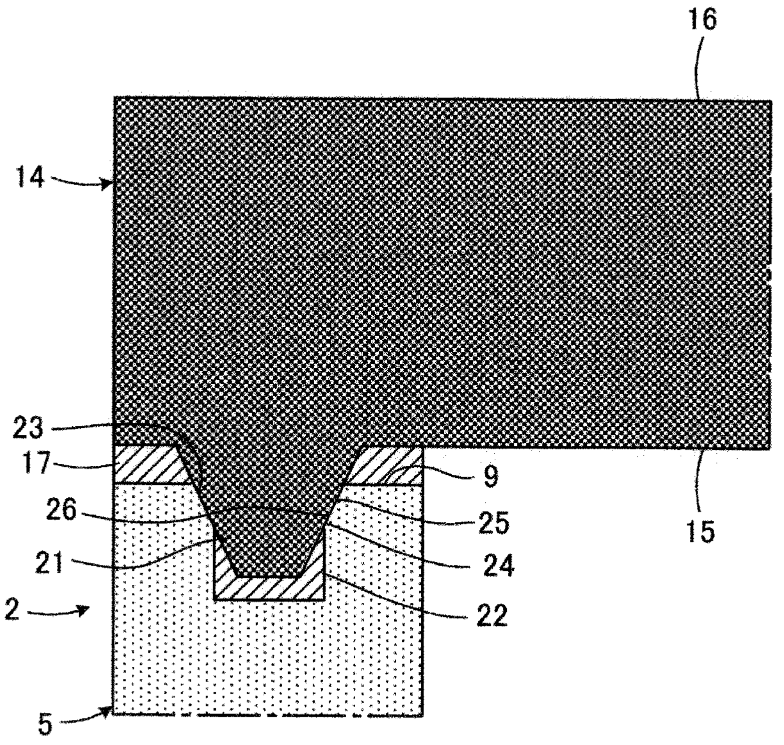
FIG. 8 is a view corresponding to FIG. 3, illustrating a sixth embodiment of the present disclosure and schematically illustrating the top plate and the core fixed to each other with the adhesive interposed therebetween.

A sixth embodiment illustrated in FIG. 8 is different from the structure illustrated in FIG. 7 in shape of the recess 22. In FIG. 8, the edge portion that defines the opening of the recess 22 is chamfered to form the facing-inward sloped surface 23. The facing-inward sloped surface 23 forms, together with the facing-outward sloped surface 24 formed by the outer peripheral surface of the projection 21, the guide surfaces capable of guiding the projection 21 into the recess 22. Further, of the first abutment portion 25 and the second abutment portion 26 that are brought into abutment against each other when the recess 22 receives the projection 21, the first abutment portion 25 is formed by the facing-outward sloped surface 24 of the projection 21 and the second abutment portion 26 is formed by the facing-inward sloped surface 23 along the edge portion that defines the opening of the recess 22. In this case, the first abutment portion 25 and the second abutment portion 26 are in contact with each other over a relatively large area.

Figure 9:
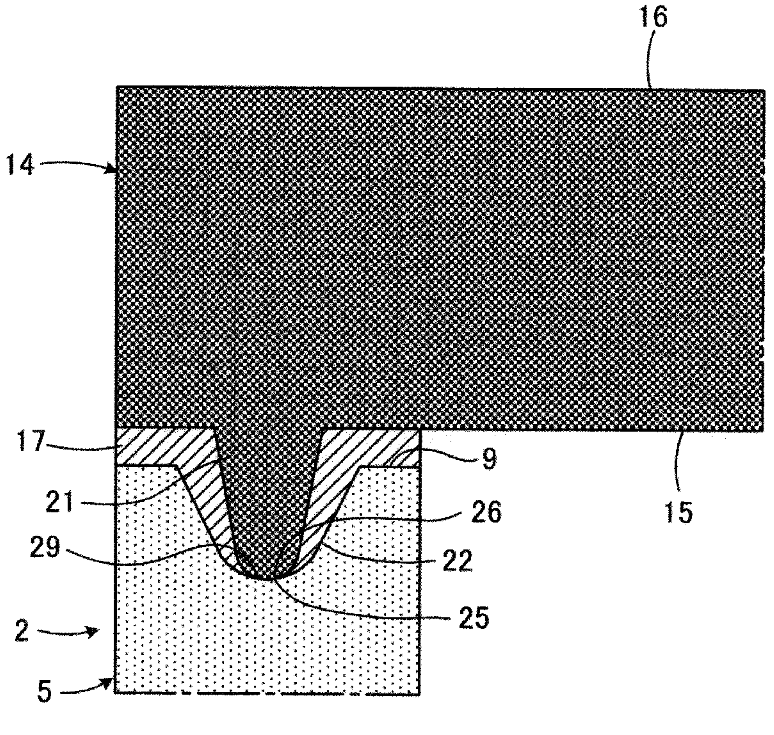
FIG. 9 is a view corresponding to FIG. 3, illustrating a seventh embodiment of the present disclosure and schematically illustrating the top plate and the core fixed to each other with the adhesive interposed therebetween.

In a seventh embodiment illustrated in FIG. 9, in one of the cross sections along the direction in which positioning is achieved, for example, in the cross section of FIG. 9, the recess 22 has a concave bottom surface 29 and only the distal end portion of the projection 21 is in abutment against the concave bottom surface 29. Of the first abutment portion 25 and the second abutment portion 26 that are brought into abutment against each other when the recess 22 receives the projection 21, the first abutment portion 25 is formed by the distal end portion of the projection 21 and the second abutment portion 26 is formed by the concave bottom surface 29. Further, the outer surface of the projection 21 and the wall surface that defines the recess 22 form the guide surfaces capable of guiding the projection 21 into the recess 22.

In the structure illustrated in FIG. 9, a magnetic path is formed due to the contact between the core 2 and the top plate 14, thereby affecting the DC superimposition characteristics. Thus, according to the seventh embodiment illustrated in FIG. 9, the contact area between the core 2 and the top plate 14 can be adjusted by changing the shape of the concave bottom surface 29 so that the effect on the DC superimposition characteristics can be easily adjusted.

Figure 10A:
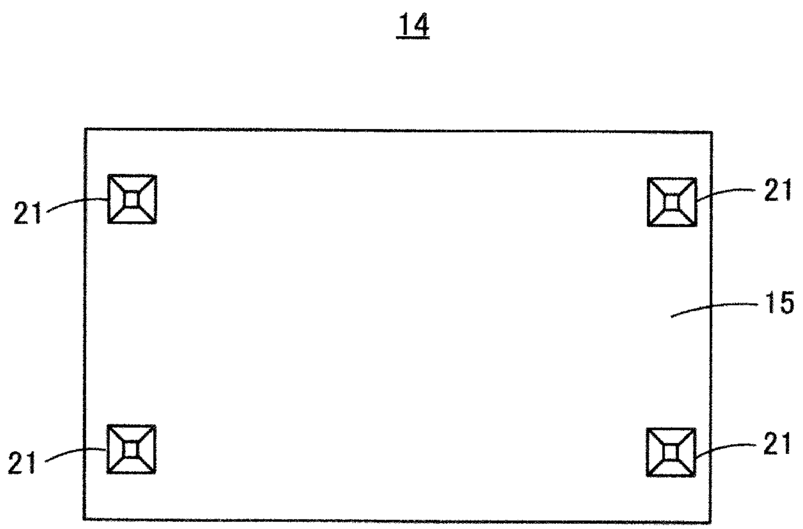
FIGS. 10A and 10B are views corresponding to FIGS. 2A and 2B, illustrating an eighth embodiment of the present disclosure and separately illustrating the top plate and the core.
Figure 10B:
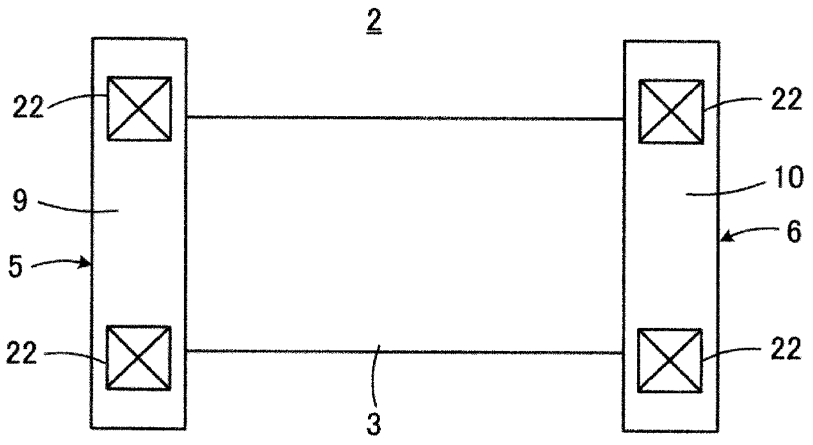

FIGS. 10A and 10B are views corresponding to FIGS. 2A and 2B, separately illustrating the top plate 14 and the core 2 that are employed in an eighth embodiment.

In the eighth embodiment illustrated in FIGS. 10A and 10B, the projections 21 provided on the lower main surface 15 of the top plate 14 have an outer peripheral surface that forms a quadrangular pyramid and the recesses 22 for receiving the projections 21, the recesses 22 being provided in the top surfaces 9 and 10 of the flange portions 5 and 6, have an inner peripheral surface that forms a quadrangular pyramid. The projection 21 preferably has a quadrangular truncated pyramid shape with the chamfered distal end. With this, the distal end of the projection 21 can be prevented from being chipped in manufacturing the coil component 1.

What is important in the eighth embodiment illustrated in FIGS. 10A and 10B is to indicate that the planar shapes of the projections 21 and the recesses 22 provided in the form of spots may be variously changed.

Figure 11A:
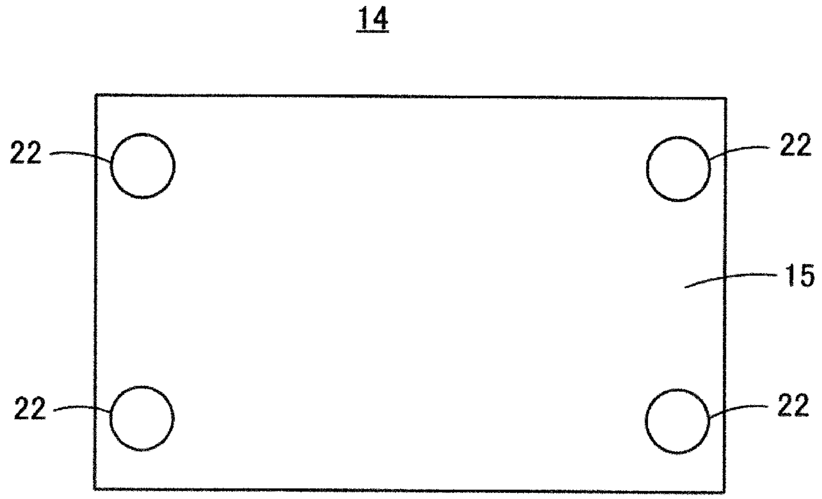
FIGS. 11A and 11B are views corresponding to FIGS. 2A and 2B, illustrating a ninth embodiment of the present disclosure and separately illustrating the top plate and the core.
Figure 11B:
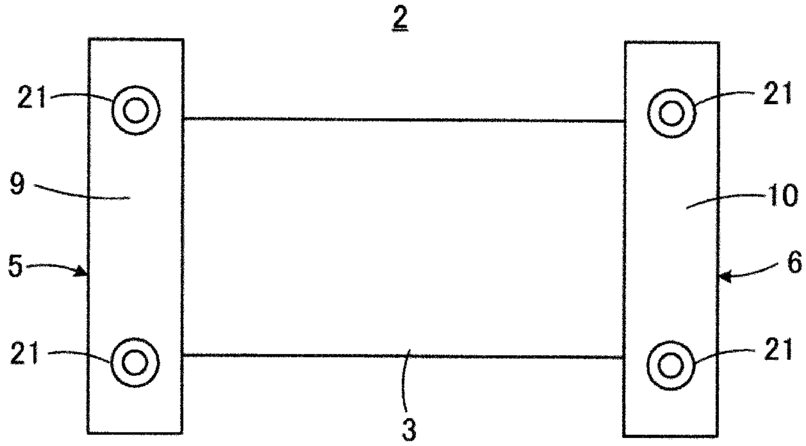

FIGS. 11A and 11B are views corresponding to FIGS. 2A and 2B, separately illustrating the top plate 14 and the core 2 that are employed in a ninth embodiment.

In the ninth embodiment illustrated in FIGS. 11A and 11B, the projections 21 are provided on the top surfaces 9 and 10 of the flange portions 5 and 6 included in the core 2 and the recesses 22 are provided in the lower main surface 15 of the top plate 14. The structure illustrated in FIGS. 11A and 11B indicates that the positional relationship of the projection 21 and the recess 22 may be reversed.

Note that, in terms of the ease of manufacturing, more specifically, the ease of molding of each of the core 2 and the top plate 14 and the simplification of the shape of the mold, the projections 21 are preferably provided on the top plate 14 having a simpler shape. However, when the recesses 22 are provided in the top plate 14 as illustrated in FIGS. 11A and 11B, the adhesive can be held on the top plate 14 having the recesses 22 to prevent the adhesive from adhering to the wire through the core 2 in coupling the top plate 14 and the core 2 to each other.

In a modification of the ninth embodiment illustrated in FIGS. 11A and 11B, some of the plurality of projections 21 may be provided on the top plate 14 and the remaining may be provided on the core 2, and the recesses 22 may be separately provided in the core 2 and the top plate 14 so as to correspond to the projections 21.

Figure 12A:
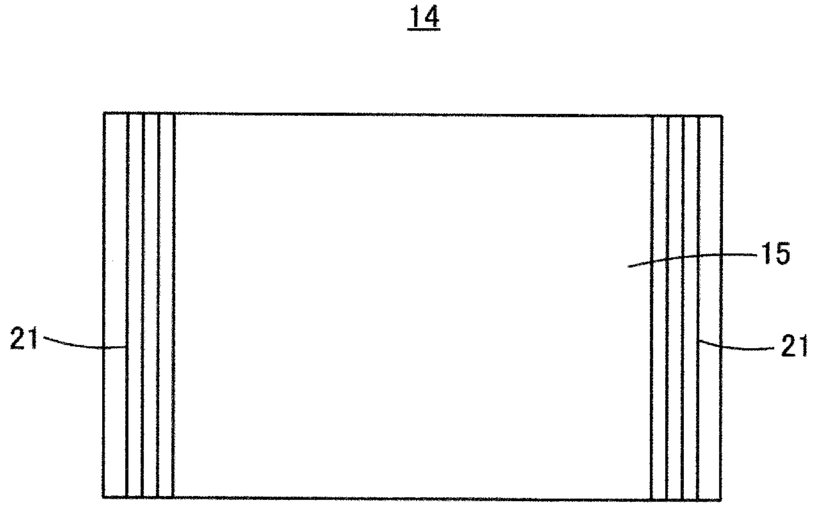
FIGS. 12A and 12B are views corresponding to FIGS. 2A and 2B, illustrating a tenth embodiment of the present disclosure and separately illustrating the top plate and the core.
Figure 12B:
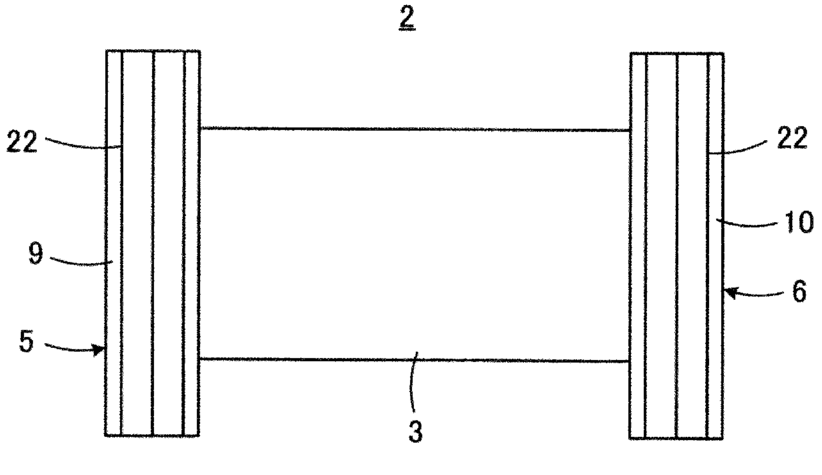

In a tenth embodiment illustrated in FIGS. 12A and 12B, the projections 21 linearly extend on the lower main surface 15 of the top plate 14 and the recesses 22 for receiving the projections 21 linearly extend on the top surfaces 9 and 10 of the flange portions 5 and 6 included in the core 2. The projections 21 and the recesses 22 extend in the width direction of the coil component. Although the cross-sectional shapes of the projection 21 and the recess 22 are not illustrated, cross-sectional shapes similar to the cross-sectional shapes illustrated in each of FIGS. 3A to FIG. 9 described above can be employed.

Figure 13A:
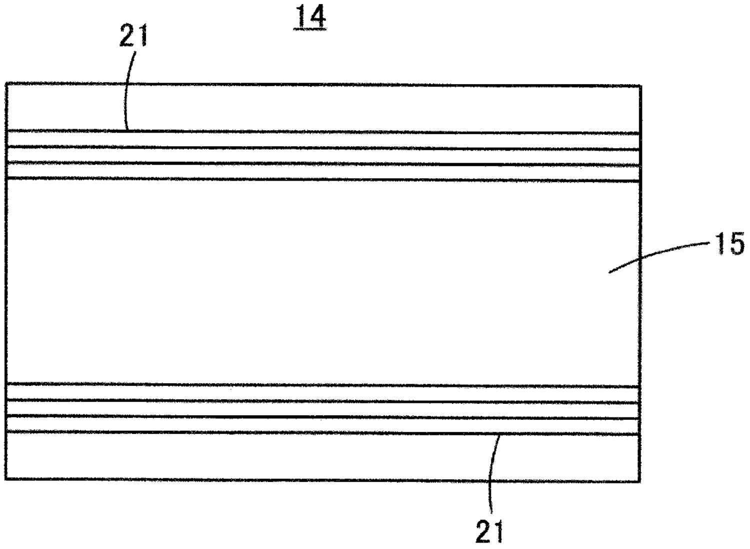
FIGS. 13A and 13B are views corresponding to FIGS. 2A and 2B, illustrating an eleventh embodiment of the present disclosure and separately illustrating the top plate and the core.
Figure 13B:
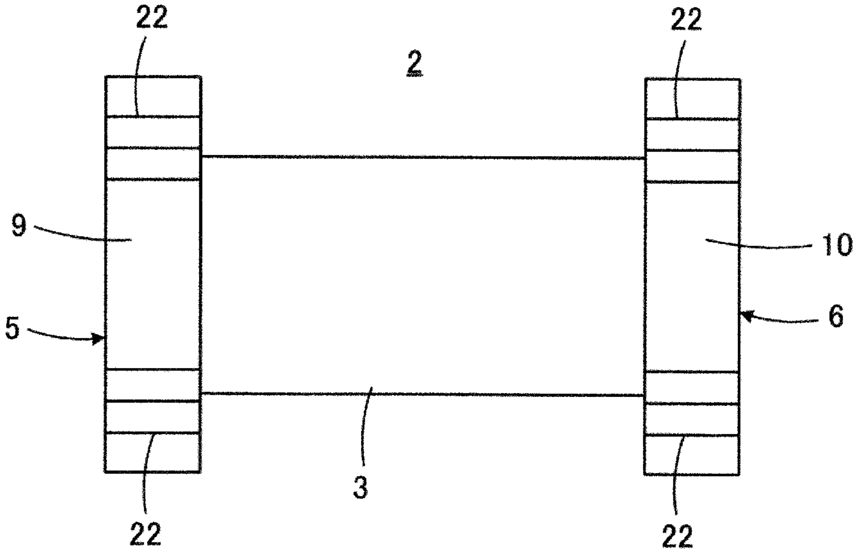

In an eleventh embodiment illustrated in FIGS. 13A and 13B, as in the embodiment illustrated in FIGS. 12A and 12B, the projections 21 linearly extend on the lower main surface 15 of the top plate 14 and the recesses 22 for receiving the projections 21 linearly extend on the top surfaces 9 and 10 of the flange portions 5 and 6 included in the core. The projections 21 and the recesses 22 extend, however, in the length direction of the coil component. Also in FIGS. 13A and 13B, the cross-sectional shapes of the projection 21 and the recess 22 are not illustrated, but cross-sectional shapes similar to the cross-sectional shapes illustrated in each of FIGS. 3A to FIG. 9 described above can be employed.

Figure 14A:
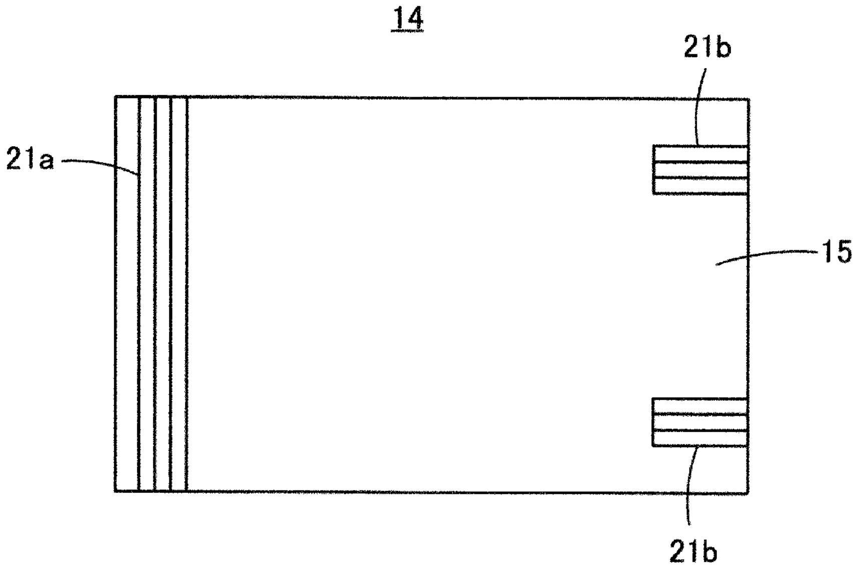
FIGS. 14A and 14B are views corresponding to FIGS. 2A and 2B, illustrating a twelfth embodiment of the present disclosure and separately illustrating the top plate and the core.
Figure 14B:
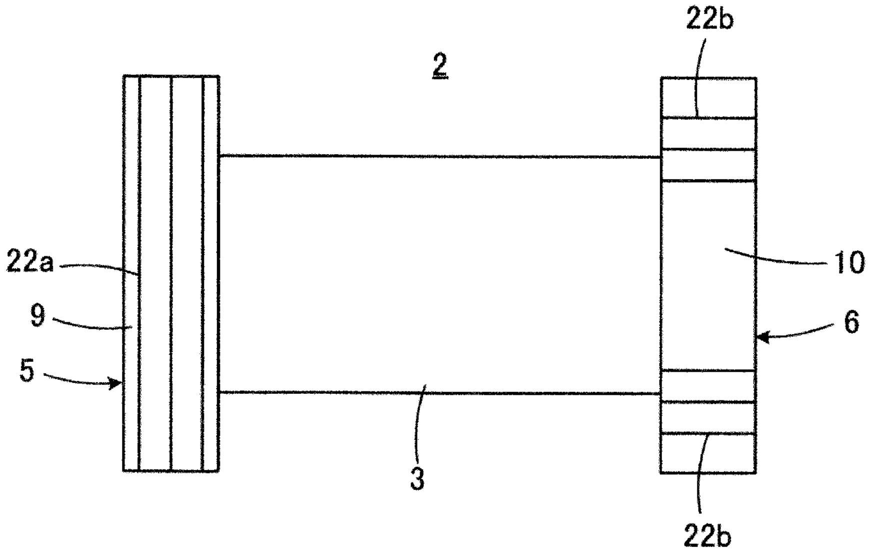

In a twelfth embodiment illustrated in FIGS. 14A and 14B, the embodiment illustrated in FIGS. 12A and 12B and the eleventh embodiment illustrated in FIGS. 13A and 13B are combined. That is, a projection 21*a* linearly extending in the width direction of the coil component and projections 21*b* linearly extending in the length direction of the coil component are provided on the lower main surface 15 of the top plate 14, and a recess 22*a* linearly extending in the width direction of the coil component and recesses 22*b* linearly extending in the length direction of the coil component are provided in the top surfaces 9 and 10 of the flange portions 5 and 6 included in the core 2 so as to correspond to the projections 21*a* and 21*b*. Also in FIGS. 14A and 14B, the cross-sectional shapes of the projection 21 and the recess 22 are not illustrated, but cross-sectional shapes similar to the cross-sectional shapes illustrated in each of FIGS. 3A to FIG. 9 described above can be employed.

Figure 15A:
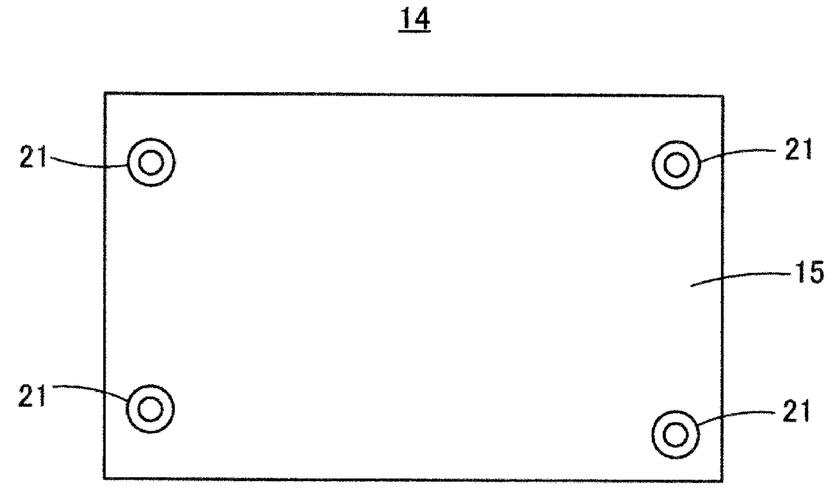
FIGS. 15A and 15B are views corresponding to FIGS. 2A and 2B, illustrating a thirteenth embodiment of the present disclosure and separately illustrating the top plate and the core.
Figure 15B:
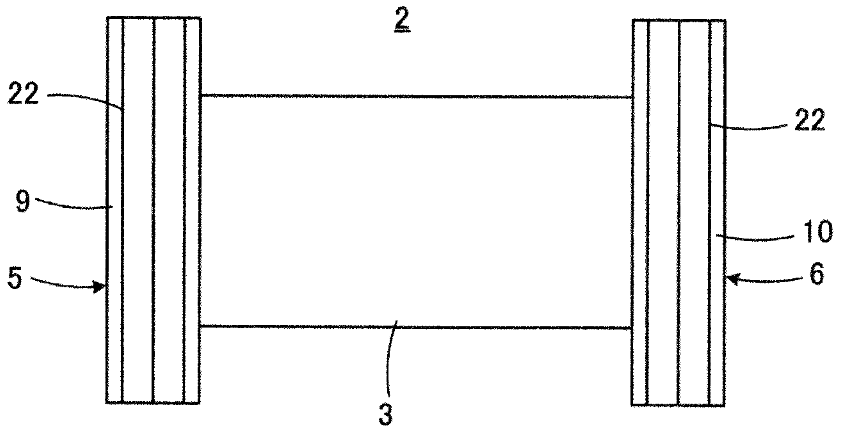

In a thirteenth embodiment illustrated in FIGS. 15A and 15B, the top plate 14 employs the form of the top plate 14 illustrated in FIG. 2A and the core 2 employs the form of the core 2 illustrated in FIG. 12B. What is important in the present embodiment is to indicate that the combination of the projections 21 in the form of spots and the linear recesses 22 may be employed to realize the positioning function, more specifically, to form the guide surfaces and the first and second abutment portions.

Figure 16A:
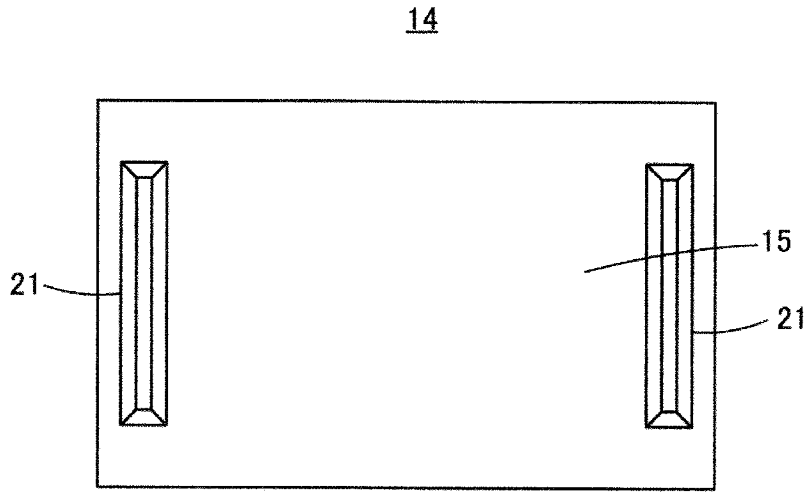
FIGS. 16A and 16B are views corresponding to FIGS. 2A and 2B, illustrating a fourteenth embodiment of the present disclosure and separately illustrating the top plate and the core.
Figure 16B:
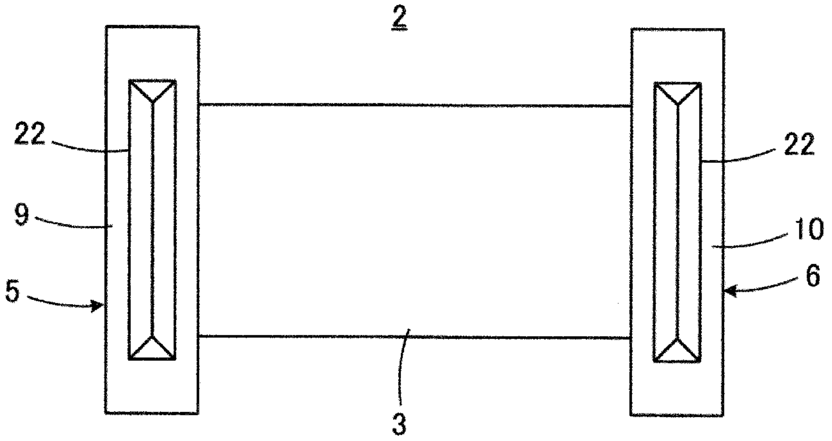

In a fourteenth embodiment illustrated in FIGS. 16A and 16B, a condition that may arise in the embodiment illustrated in FIGS. 12A and 12B can be addressed. That is, when the projections 21 reach the periphery of the lower main surface 15 of the top plate 14 and the recesses 22 reach the periphery of each of the top surfaces 9 and 10 of the flange portions 5 and 6 as in the embodiment illustrated in FIGS. 12A and 12B, the space that is filled with the adhesive 17 (see FIGS. 3A and 3B or the like) forms relatively large openings in the outer surface of the coil component. Thus, a relatively large amount of the adhesive 17 may ooze out.

To address the condition described above, in the fourteenth embodiment illustrated in FIGS. 16A and 16B, the projections 21 are located to be prevented from reaching the periphery of the lower main surface 15 of the top plate 14 and the recesses 22 are located to be prevented from reaching the periphery of each of the top surfaces 9 and 10 of the flange portions 5 and 6.

In the first to ninth embodiments described with reference to FIGS. 1A to FIG. 11B, a plurality of sets, more specifically, two sets of the projections 21 and the recesses 22 are provided to each of the region in which the lower main surface 15 of the top plate 14 and the top surface 9 of the first flange portion 5 face each other and the region in which the lower main surface 15 of the top plate 14 and the top surface 10 of the second flange portion 6 face each other. Then, the plurality of sets of the projections 21 and the recesses 22 are placed at symmetrical positions with respect to a surface that includes the central axis line of the winding core portion 3 and is orthogonal to the lower main surface 15 of the top plate 14. Moreover, the plurality of sets of the projections 21 and the recesses 22 are placed at symmetrical positions with respect to a surface that is orthogonal to the central axis line of the winding core portion 3 and passes through the middle point in the axial direction AX of the winding core portion 3.

The configuration described above offers an advantage that the posture of the top plate 14 relative to the core 2 can be kept stable. In the present disclosure, however, conditions for the selection of the numbers and placement of the projections 21 and the recesses 22 do not necessarily include obtaining such an advantage.

Figure 17A:
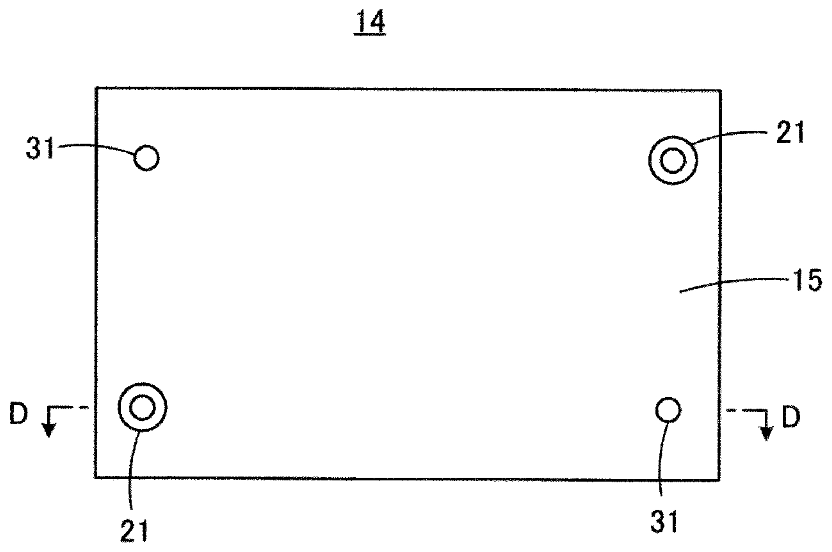
FIGS. 17A and 17B are views corresponding to FIGS. 2A and 2B, illustrating a fifteenth embodiment of the present disclosure and separately illustrating the top plate and the core.
Figure 17B:
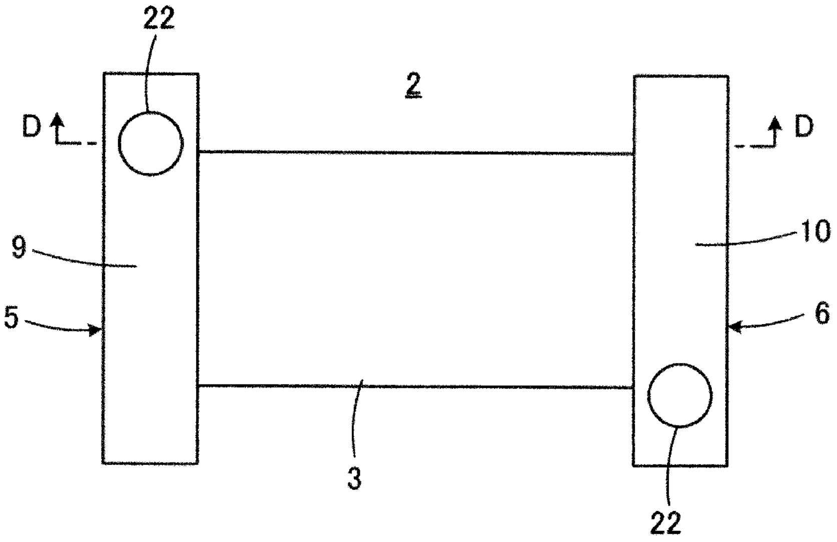
Figure 18:
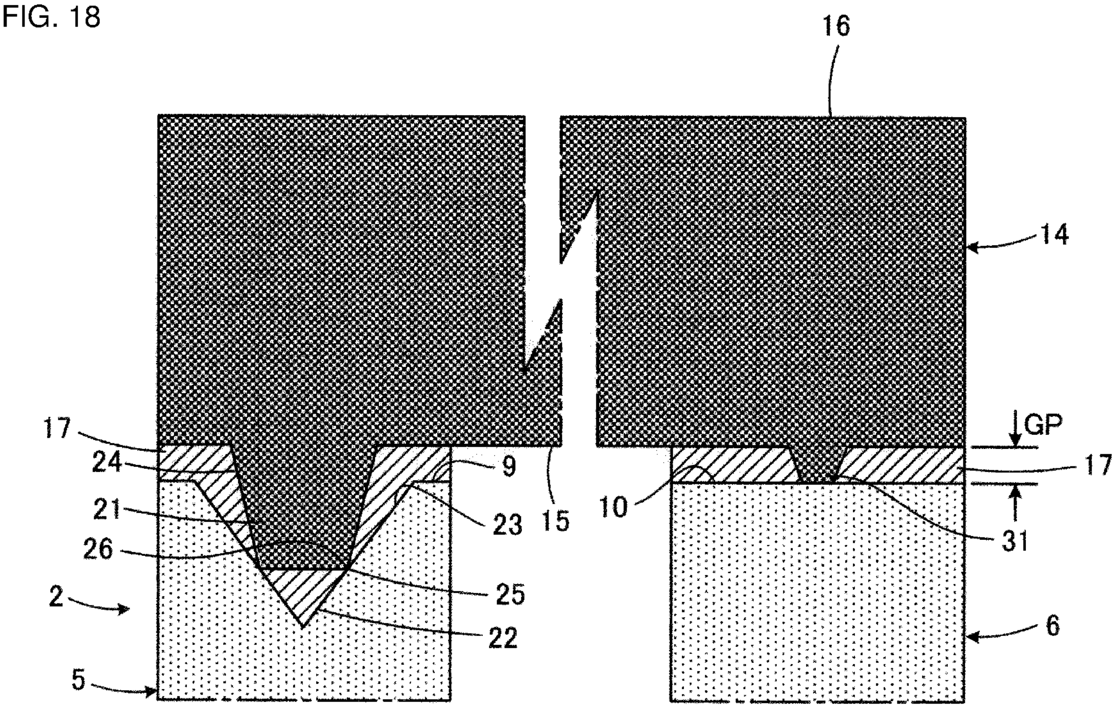
FIG. 18 is an enlarged sectional view taken along the line D-D of FIGS. 17A and 17B, schematically illustrating the top plate and the core, which are illustrated in FIGS. 17A and 17B, fixed to each other with the adhesive interposed therebetween.

Further, to keep the posture of the top plate 14 relative to the core 2 stable, as in a fifteenth embodiment illustrated in FIGS. 17A and 17B and FIG. 18, a configuration other than the sets of the projections 21 and the recesses 22 can also be employed in combination with the configuration of the sets of the projections 21 and the recesses 22.

In the fifteenth embodiment illustrated in FIGS. 17A and 17B and FIG. 18, in addition to the configuration of the sets of the projections 21 and the recesses 22, there are second projections 31 facing the portions of the top surfaces 9 and 10 of the flange portions 5 and 6 in which no recess is provided. The second projections 31 are in abutment against the top surfaces 9 and 10 of the flange portions 5 and 6 with the gap GP formed between the lower main surface 15 of the top plate 14 and the top surfaces 9 and 10 of the flange portions 5 and 6.

In the embodiment described above, with the sets of the projections 21 and the recesses 22, the positioning of the top plate 14 relative to the core 2 in the directions along the lower main surface 15 of the top plate 14 and the top surfaces 9 and 10 of the flange portions 5 and 6 can be achieved, and with the sets of the projections 21 and the recesses 22 and the second projections 31, the gap can be formed between the lower main surface 15 of the top plate 14 and the top surfaces 9 and 10 of the flange portions 5 and 6.

In the embodiments described above, as illustrated in FIGS. 1A and 1B and described above, one end of the wire 13 is connected to the first terminal electrode 11 on the side of the bottom surface 7 of the first flange portion 5 and the other end thereof is connected to the second terminal electrode 12 on the side of the bottom surface 8 of the second flange portion 6. With such a configuration, the end portions of the wire 13 are not necessarily located at the coupling portions between the core 2 and the top plate 14 so that the positions of the projection 21 and the recess 22 can be freely selected.

Although the present disclosure is described above in relation to the illustrated embodiments, other various modifications can be made within the scope of the present disclosure.

For example, the coil component to which the present disclosure is directed may form a common mode choke coil, a transformer, a balun, or the like other than a single coil as in the illustrated embodiments. Thus, the number of wires may be changed depending on the function of the coil component and the number of terminal electrodes provided on each flange portion may also be changed accordingly.

Further, in configuring the coil component according to the present disclosure, the components of different ones of the embodiments described herein can be partially replaced or combined.

What is claimed is:

1. A coil component comprising:

a core that includes a winding core portion that extends in an axial direction and a first flange portion and a second flange portion that are at a first end and a second end, respectively, that are opposite ends in the axial direction of the winding core portion;

a top plate that has a lower main surface and an upper main surface that face directions opposite to each other;

at least one wire wound around the winding core portion; and a first terminal electrode and a second terminal electrode that are electrically connected to respective end portions of the wire and at the first flange portion and the second flange portion, respectively, wherein the first flange portion and the second flange portion each have a bottom surface that faces a mounting substrate when the coil component is mounted and a top surface on an opposite side of the bottom surface, the top plate is fixed to the core with an adhesive interposed therebetween while the lower main surface is facing the top surface of each of the first flange portion and the second flange portion, when one of the top surface of at least one of the first flange portion and the second flange portion and the lower main surface is defined as a first surface and another thereof is defined as a second surface, a projection is on the first surface and a recess for receiving the projection is in the second surface, at least one of an outer surface of the projection and a wall surface that defines the recess has a guide surface configured to guide the projection into the recess, the outer surface of the projection and the wall surface that defines the recess configure a first abutment portion and a second abutment portion, respectively, that are brought into abutment against each other when the recess receives the projection, and an abutment between the first abutment portion and the second abutment portion configures a termination end of the projection inserted into the recess with a gap between the first surface and the second surface, thereby achieving positioning in a direction of the insertion and achieving alignment of the top plate relative to the core in at least one of directions along the first surface and the second surface.

2. The coil component according to claim 1, wherein in a cross section along the direction in which the positioning is achieved, the projection has a distal end portion smaller than an opening of the recess in dimensions measured along the first surface and the recess has a facing-inward sloped surface inclined to reduce dimensions of the recess measured along the second surface from the opening toward a bottom, and the facing-inward sloped surface configures the guide surface.

3. The coil component according to claim 2, wherein the distal end portion of the projection configures the first abutment portion, and the facing-inward sloped surface of the recess configures the second abutment portion.

4. The coil component according to claim 1, wherein in a cross section along the direction in which the positioning is achieved, the projection has a facing-outward sloped surface inclined to increase dimensions of the projection measured along the first surface from the distal end portion toward a base that is a portion in contact with the lower main surface, and the facing-outward sloped surface configures the guide surface.

5. The coil component according to claim 1, wherein in a cross section along the direction in which the positioning is achieved, the projection has a facing-outward sloped surface inclined to increase dimensions of the projection measured along the first surface from the distal end portion toward a base, the facing-outward sloped surface configures the guide surface, the facing-outward sloped surface of the projection configures the first abutment portion, and an edge portion that configures an opening of the recess configures the second abutment portion.

6. The coil component according to claim 1, wherein in a cross section along the direction in which the positioning is achieved, the recess has a concave bottom surface, only a distal end portion of the projection is in abutment against the concave bottom surface, the distal end portion of the projection configures the first abutment portion, and the concave bottom surface configures the second abutment portion.

7. The coil component according to claim 1, wherein a plurality of the projections are at a plurality of places on the first surface as spots, and a plurality of the recesses are at a plurality of places on the second surface as spots.

8. The coil component according to claim 7, wherein the projection has an outer peripheral surface that configures at least a portion of a cone, and the recess has a conical inner peripheral surface.

9. The coil component according to claim 8, wherein the projection has a frustoconical shape.

10. The coil component according to claim 7, wherein the projection has an outer peripheral surface that configures a quadrangular pyramid, and the recess has an inner peripheral surface that configures a quadrangular pyramid.

11. The coil component according to claim 10, wherein the projection has a quadrangular truncated pyramid shape.

12. The coil component according to claim 7, wherein a plurality of sets of the projections and the recesses are at each of a region in which the lower main surface and the top surface of the first flange portion face each other and a region in which the lower main surface and the top surface of the second flange portion face each other.

13. The coil component according to claim 12, wherein the plurality of sets of the projections and the recesses are placed at symmetrical positions with respect to a surface that includes a central axis line of the winding core portion and is orthogonal to the lower main surface.

14. The coil component according to claim 12, wherein the plurality of sets of the projections and the recesses are placed at symmetrical positions with respect to a surface that is orthogonal to a central axis line of the winding core portion and passes through a middle point in the axial direction of the winding core portion.

15. The coil component according to claim 1, wherein the projection and the recess linearly extend on the first surface and the second surface, respectively.

16. The coil component according to claim 1, wherein the projection and the recess are located to be prevented from reaching a periphery of the first surface and a periphery of the second surface, respectively.

17. The coil component according to claim 1, further comprising:

a second projection on at least one of the first surface and the second surface, wherein the second projection is in abutment against the first surface or the second surface while the gap is between the first surface and the second surface.

18. The coil component according to claim 1, wherein the first surface is the lower main surface, and the second surface is the top surface of at least one of the first flange portion and the second flange portion.

19. The coil component according to claim 1, wherein a connection portion between one end portion of the wire and the first terminal electrode and a connection portion between another end portion of the wire and the second terminal electrode are on a side of the bottom surface of the first flange portion and a side of the bottom surface of the second flange portion, respectively.

20. The coil component according to claim 2, wherein in a cross section along the direction in which the positioning is achieved, the projection has a facing-outward sloped surface inclined to increase dimensions of the projection measured along the first surface from the distal end portion toward a base that is a portion in contact with the lower main surface, and the facing-outward sloped surface configures the guide surface.

* * * * *